United States Patent [19]
Linzer

[11] Patent Number: 5,638,130
[45] Date of Patent: Jun. 10, 1997

[54] DISPLAY SYSTEM WITH SWITCHABLE ASPECT RATIO

[75] Inventor: Elliot N. Linzer, Bronx, N.Y.

[73] Assignee: International Business Machines Corporation, Armonk, N.Y.

[21] Appl. No.: 450,196

[22] Filed: May 25, 1995

[51] Int. Cl.$^6$ ............................. H04N 7/01; H04N 5/46
[52] U.S. Cl. ........................................ 348/445; 348/556
[58] Field of Search ............................... 348/445, 556, 348/441, 705, 706, 913, 904; H04N 7/01, 5/46

[56] References Cited

U.S. PATENT DOCUMENTS

| | | | |
|---|---|---|---|
| 5,243,421 | 9/1993 | Nagata et al. | 348/445 |
| 5,343,238 | 8/1994 | Takata et al. | 348/556 |
| 5,400,077 | 3/1995 | Cookson et al. | 348/445 |
| 5,534,934 | 7/1996 | Katsumata et al. | 348/556 |

*Primary Examiner*—Victor R. Kostak
*Attorney, Agent, or Firm*—Richard M. Ludwin

[57] ABSTRACT

A system and method for receiving a video sequence with a given aspect ratio and displaying that sequence on a device with a different aspect ratio in letterbox form by performing letterbox type conversion immediately before display. In letterbox form, the viewer sees the entire active region of the picture but the whole screen is not used. In one embodiment a video sequence with a given aspect ratio can be displayed on a device with a different aspect ratio in letterbox or pan-scan form, at the users discretion, by performing, respectively, letterbox or pan-scan conversion immediately before display. Thus, the user can decide to use the entire screen or to see the entire picture.

4 Claims, 6 Drawing Sheets

DISPLAY SYSTEM WITH SWITCHABLE ASPECT RATIO

BACKGROUND OF THE INVENTION

1. Field of the Invention

The present invention relates to the field of image display systems and more particularly to techniques for displaying video and still pictures on a monitor where the aspect ratio of the monitor differs from the aspect ratio of the pictures.

2. Related Art

Motion video and still picture information is often captured (e.g., recorded on film) with one aspect ratio and then must be displayed on a system with a different aspect ratio. An example of when this occurs is when movies are converted to video signals to be displayed on television monitors. Each frame in a "modern" movie has a display aspect ratio of 9:16; that is, the ratio of the height to the width of the display area on the screen on which the movie is to be viewed is 9 to 16. The ratio of the height to the width of a television display area (in the U.S.) is about 3:4. Therefore, some processing must be performed to display a movie on a television set.

FIG. 1 illustrates the more common method of showing movies on television; we refer to this method as the "pan-scan" method. For the pan-scan method, a subpicture from each picture is selected, and the rest of the picture is discarded. Specifically, areas on the leftmost and rightmost sides of the pictures are discarded, and the picture that remains has an aspect ratio of 3:4, so it may be viewed on a television set. A video signal containing only the remaining rectangle is generated, and this signal is broadcasted or stored on a video tape. The location of the "display rectangle" within the entire picture may vary from picture to picture. This method is referred to as the pan-scan method because the retained rectangle is often moved from left to right or vice-versa as the camera pans so that the more important parts of the scene are retained.

FIG. 2 illustrates the "letterbox" method of displaying movies on television. For this method, a blank area is appended to the top and bottom of each picture, so that the aspect ratio of a picture made up of the original picture plus the blank areas is 3:4. These pictures are then used to generate a video signal that is then broadcasted or stored on a video tape.

When a movie is broadcast (through the air or cable) or stored on a video tape, it is typically converted to the correct aspect ratio using either the pan-scan or letterbox method and then broadcasted or stored on video tape. In this case, the television receiver or tape player does not have to do any aspect ratio conversion; the pictures already have the correct aspect ratio.

Technological advances in digital transmission networks, digital storage media, Very Large Scale Integration devices, and digital processing of video and audio signals are converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including: video-telephony and teleconferencing; high quality digital television transmission on coaxial and fiber-optic networks as well as broadcast terrestrially and over direct broadcast satellites; and in interactive multimedia products on CD-ROM, Digital Audio Tape, and Winchester disk drives.

Among these standards, the MPEG-2 standard provides a tool for creating a digital representation of a video sequence that can be displayed on monitors with different aspect ratios. Specifically, an MPEG-2 sequence can contain information to reconstruct the entire area of each picture in a video sequence and also contain information about what should be displayed if the monitor has an aspect ratio that is different from the aspect ratio of the coded pictures. For example, a movie can be compressed so that each frame (with a 9:16 aspect ratio) can be completely reconstructed, but the location of the display rectangle is also provided for each frame. In this case, an MPEG-2 decoder connected to a display device with a 9:16 aspect ratio would display each picture in its entirety, but an MPEG-2 decoder connected to a display with a 3:4 aspect ratio would extract and display only the display rectangle. Thus, the MPEG-2 standard provides a tool for encoding a video sequence with a given aspect ratio and displaying that sequence on a device with a different aspect ratio in pan-scan form by performing pan-scan conversion immediately before display.

Another conventional system of handling aspect ratio conversion involves proving a widescreen (e.g. 9:16) television receiver with multiple display modes. If the television receives a regular 3:4 aspect ratio signal, the picture is cropped vertically and displayed on the entire screen; in this case, the entire screen is used but not all of the active picture is displayed. If the television receives a signal with a 3:4 aspect ratio but with an active area that is 9:16—e.g., a movie that has been converted to letterbox format for display on a television set with a 3:4 aspect ratio and is broadcast with blank areas on the bottom and top of each picture—the television again crops the picture vertically and displays the resulting image on the entire screen; in this case, the entire screen is used and the active part of the scene is retained. Finally, if the television receives a signal from a source having a display aspect ratio of 9:16 the entire signal is displayed without cropping. It is noted that for all of the display modes in the above described system, the entire screen area is used to display all or part of the active part of each picture.

SUMMARY OF THE INVENTION

In light of the above, the present invention includes a system and method for receiving a video sequence with a given aspect ratio and displaying that sequence on a device with a different aspect ratio in letterbox form by performing letterbox type conversion immediately before display. In letterbox form, the viewer will see the entire active region of the picture but the whole screen will not be used.

According to another aspect of the present invention, a system and method are provided for receiving a video sequence with a given aspect ratio and displaying that sequence on a device with a different aspect ratio in letterbox or pan-scan form, at the users discretion, by performing, respectively, letterbox or pan-scan conversion immediately before display. Thus, the user can decide to use the entire screen or to see the entire picture.

DETAILED DESCRIPTIONS OF THE PREFERRED EMBODIMENTS a. SOME ASPECTS OF THE MPEG-2 STANDARD

We describe a system and method for receiving a video sequence with a given aspect ratio and displaying that sequence on a device with a different aspect ratio in letterbox or pan-scan form, at the users discretion, by performing, respectively, letterbox or pan-scan conversion immediately before display. For completeness, we will describe the method used in the MPEG-2 standard to receive a video sequence with a given aspect ratio and display that sequence on a device with a different aspect ratio in pan-scan form by performing pan-scan conversion immediately before display.

An MPEG-2 video sequence is a coded representation of a component bit stream. Each picture is made up if three components; the luminance component (Y), the blue color difference component (Cb), and the red color difference component (Cr). The color difference components can be coded at the same resolution as the luminance component (4:4:4 format), with half the horizontal resolution of the luminance component (4:2:2 format), or with half the horizontal and half the vertical resolution of the luminance component (4:2:0 format).

An MPEG-2 decoder computes, from an MPEG-2 bitstream, a value corresponding to the brightness of each luminance and color difference pixel for each frame. A pixel, or picture element, represents a small rectangular part of the display area. If the luminance component has nw columns and nh rows, then in, respectively, 4:4:4, 4:2:2, and 4:2:0 format, the color difference components have, respectively, nw columns and nh rows, nw/2 columns and nh rows, and nw/2 columns and nh/2 rows. The number aspect ratio of a compressed bit stream is nh/nw.

Figure 5:
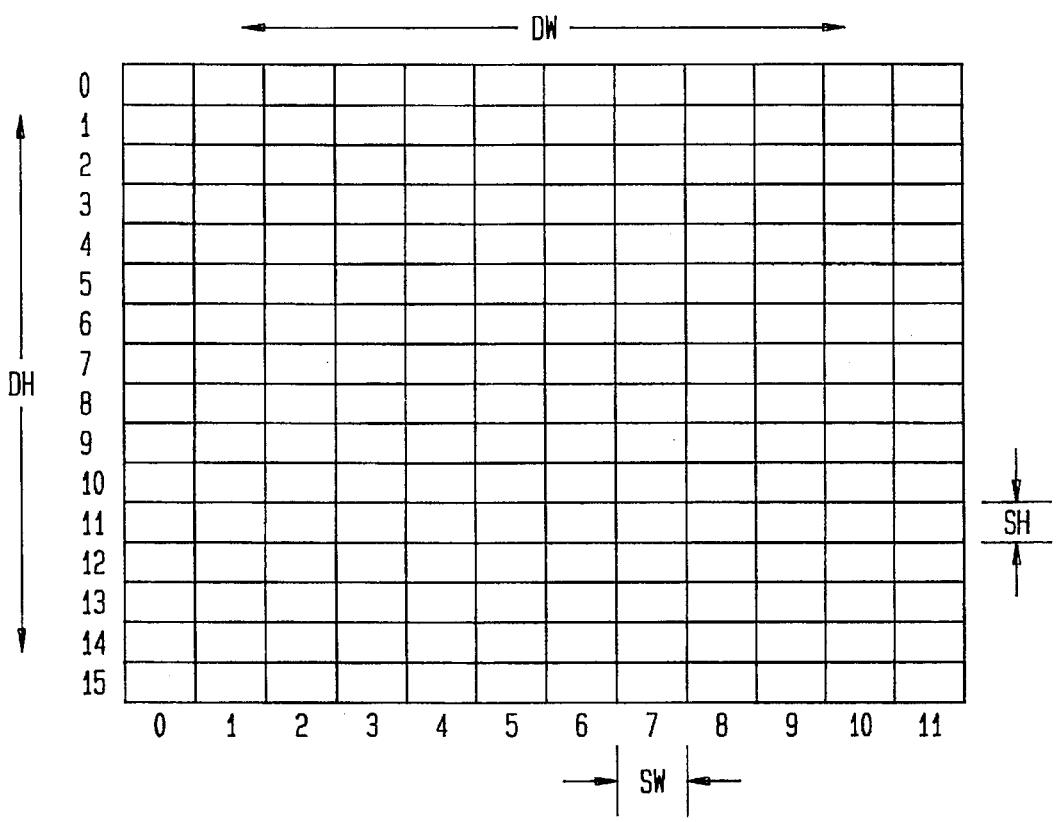
FIG. 5 is a representation of a displayed frame.

In FIG. 5 we have drawn a representation of the luminance pixels of a frame. The display width DW of the frame is the horizontal extent of the frame in linear units (e.g., inches). The display height DH of the frame is the vertical extent of the frame in linear units. The sample width SW of each pixel is the horizontal extent of each pixel in linear units. The sample height SH of each pixel is the vertical extent of each pixel in linear units. The sample aspect ratio, SAR, is the ratio of SH to SW; SAR=SH/SW. The display aspect ratio, DAR, is the ratio of DH to DW; DAR=DH/DW. The number aspect ratio, NAR, is the ratio of NH to NW; NAR=NH/NW. SAR, DAR and NAR are related by DAR= NAR X SAR.

In FIG. 5, we have drawn pixels with an SAR of ½. For the frame of FIG. 5 we have NH=16 and NW=12, so for the frame of FIG. 5 NAR=4/3 and DAR=2/3.

The MPEG-2 standard allows for the encoding of interlaced or non-interlaced video sequences. In an MPEG-2 non-interlaced bit stream, every frame is a non-interlaced frame, that is, the entire frame was captured at a single time instance. In an MPEG-2 interlaced bit stream, a frame can be either interlaced or non-interlaced. An interlaced frame is a frame where the even lines and odd lines were captured at a time separation equal to one half the frame rate. The set of odd lines or even lines in a frame is called a field. For example, if the frame rate is 30 frames/second, then a field is captured every 60th of a second.

As mentioned, the MPEG-2 standard provides a tool for pan-scan display. If the encoded sequence is for non-interlaced video and information is sent for pan-scan, then a display rectangle is given for each frame. If the encoded sequence is for interlaced video and information is sent for pan-scan, then a display rectangle is given for each field.

Figure 1:
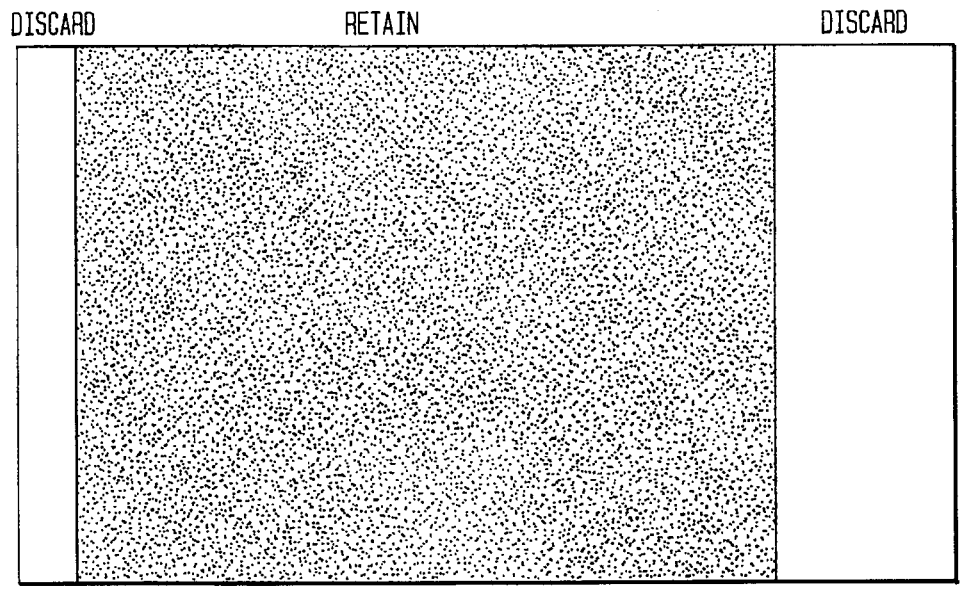
FIG. 1 is a representation of the pan-scan display method.
Figure 2:
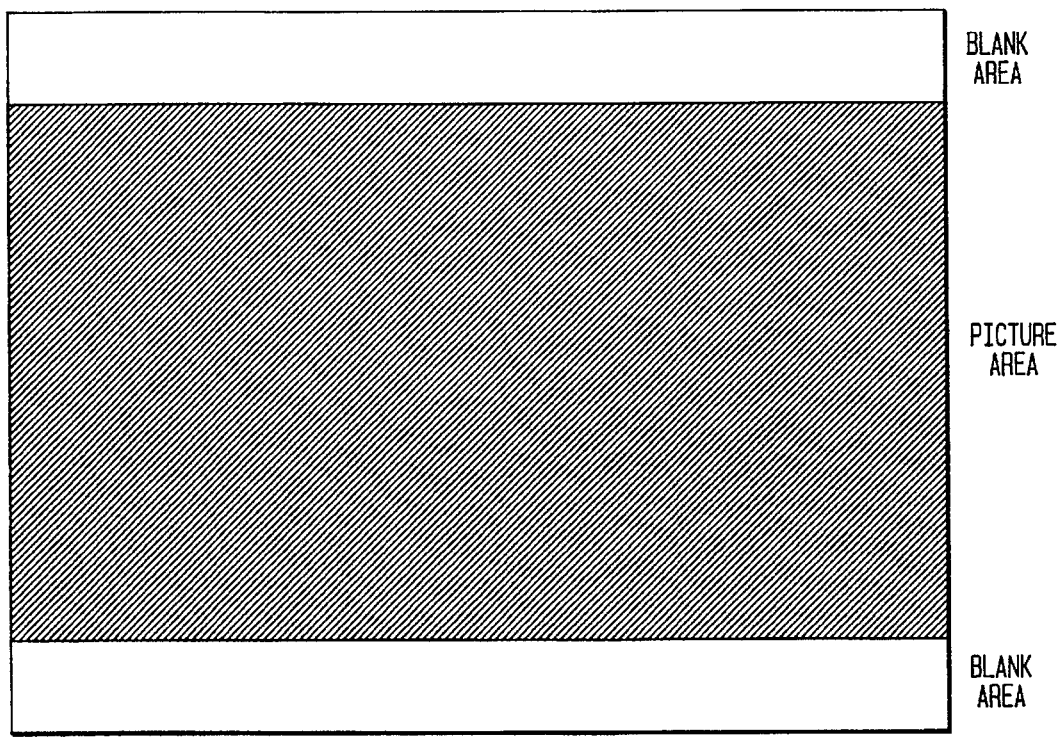
FIG. 2 is a representation of the letterbox display method.
Figure 3:
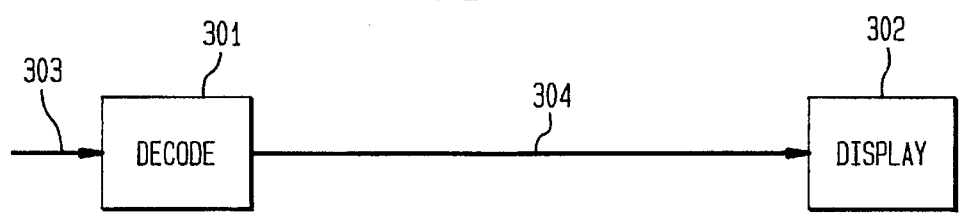
FIG. 3 is a block diagram of a video decoder and display system when the aspect ratio of the coded video is the same as the aspect ratio of the encoded video.

One can think of encoded bit streams as having sample aspect ratios. Denote by sar the sample aspect ratio of an encoded MPEG-2 bitstream. To understand this term, consider the following two cases:

1. If the number of columns and rows of pixels encoded in an MPEG-2 bit stream, nw and nh, are equal to the number of rows and columns on a display, NW and NH, and if the sar of a coded MPEG-2 bit streams matches the SAR of the display, then the video can be decoded and displayed without any additional processing and with each coded pixel representing an area on the screen that is equal to a pixel in the display device. In FIG. 3 we have shown a block diagram of an MPEG-2 decoder and display apparatus for that case. The compressed bit stream 303 is fed to a video decoder 301. The video decoder outputs the decoded video 304, which is sent to the display 302. In our terminology, the decoded video is in digital form and is in, respectively, 4:2:0, 4:2:2 or 4:4:4 format if the compressed representation of the video is, respectively, in 4:2:0, 4:2:2 or 4:4:4 format. The display device 302 then displays the decoded video 304. This display process includes digital to analog conversion.

Figure 4:
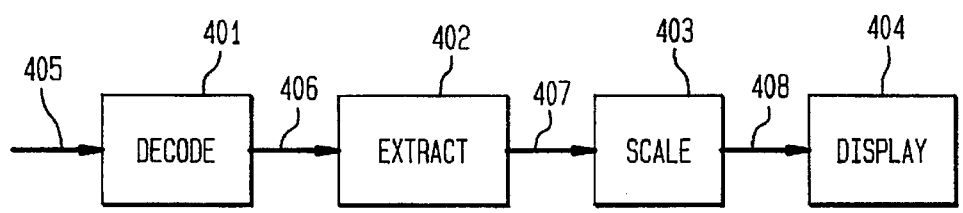
FIG. 4 is a block diagram of a video decoder and display system when the aspect ratio of the coded video is not the same as the aspect ratio of the encoded video and the video is displayed in pan-scan form.

2. The sample aspect ratio of the display, SAR, is not equal to the sample aspect ratio of the bit stream, sar. For this case, the encoder can put pan-scan information in the bit stream. A decoder and display apparatus that uses this pan-scan information is shown in FIG. 4. The encoder specifies a window width, ww, and a window height, wh, for the sequence. For the sequence to display correctly, these are chosen so that DAR=sar X wh/ww, where DAR is the display aspect ratio of the display 404. The decoder 401 receives the compressed bit stream 405 to produce the decoded video 406. From the decoded video, a rectangle ww pixels wide and wh pixels high is extracted from each frame for a non-interlaced sequence by the extractor 402 to produce the video sequence 407.

For interlaced video, a rectangle ww pixels wide and wh/2 pixels high is extracted by the extractor 402 from each field to produce the video sequence 407. For non-interlaced video, each frame is scaled to a frame NW pixels wide and NH pixels high. For interlaced video, each field is scaled to a field NW pixels wide and NH/2 pixels high. 408 to the display device 404.

The following numerical example may aid in understanding how pan-scan is used in MPEG-2. Consider an MPEG-2 bit stream with nw =720, nh=480 and sar=0.84375. If this bit stream is to be decoded and displayed on a system without using the pan-scan feature (example 1 above), then the display aspect ratio of the display device (302 above) will be 9/16. (0.84375×480/720=9/16.) If the bit stream is to be decoded on a displayed on a display with 720 columns and 480 rows but a SAR of 1.125 (and therefore a DAR of 3/4), then the encoder can specify a window width ww=540 and a window height wh=480; the decoded images will display correctly because 3/4=0.84375×480/540. Note that if pan-scan conversion is not done, i.e., the extractor 402 and the scaler 403 are simply bypassed, then the decoded images will not display correctly; they will appear to be horizontally squeezed.

We denote by dar the display aspect ratio of an encoded MPEG-2 bit stream; that is, dar=nh X sar/nw.

LETTERBOX DISPLAYING SYSTEM

It is an object of this invention to describe a system for displaying video encoded with a display aspect ratio dar on a display with a different display aspect ratio, DAR, in letterbox format. With this system, each frame is displayed completely with the correct display aspect ratio, but only part of the display area is used.

Figure 7:
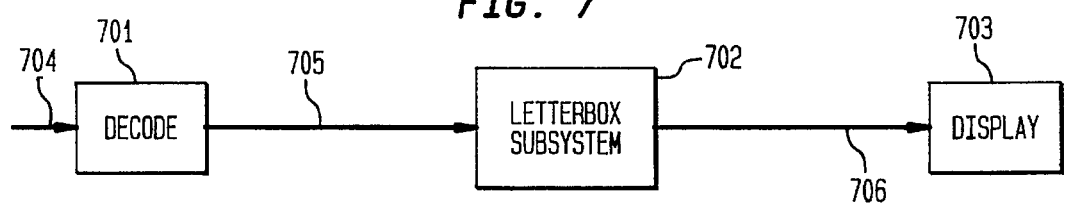
FIG. 7 is a block diagram of a video decoder and display system when the aspect ratio of the coded video is not the same as the aspect ratio of the encoded video and the video is displayed in letterbox form.

An embodiment for such a system can be found in FIG. 7. By way of example, the system of FIG. 7 can be embodied as an integral part of a television set, in a combination of a television set (e.g. including the display) and a set-top decoder box (including components 701 and 702), or as part of a graphics subsystem of a general purpose computer. The system shown in FIG. 7 has a decoder 701 which is identical to the decoder 401 in FIG. 4. The system in FIG. 7 has a display device 703 which is identical to the display device 404 in FIG. 4. For both the system shown in FIG. 7 system and the system shown in FIG. 4, the video is encoded with display aspect ratio dar that differs from the display aspect ratio DAR of the display device. However, for the system shown in FIG. 4 the video is displayed in pan-scan format, whereas for the system shown in FIG. 7 the video is displayed in letterbox format.

For the system shown in FIG. 7, the decoder 701 receives the compressed bit stream 704 to produce the decoded video 705. The decoded video 705 is sent to a letterbox subsystem (shown in more detail in FIG. 8), which produces a video sequence in letterbox form, 706, which is sent to the display 703.

Figure 9:
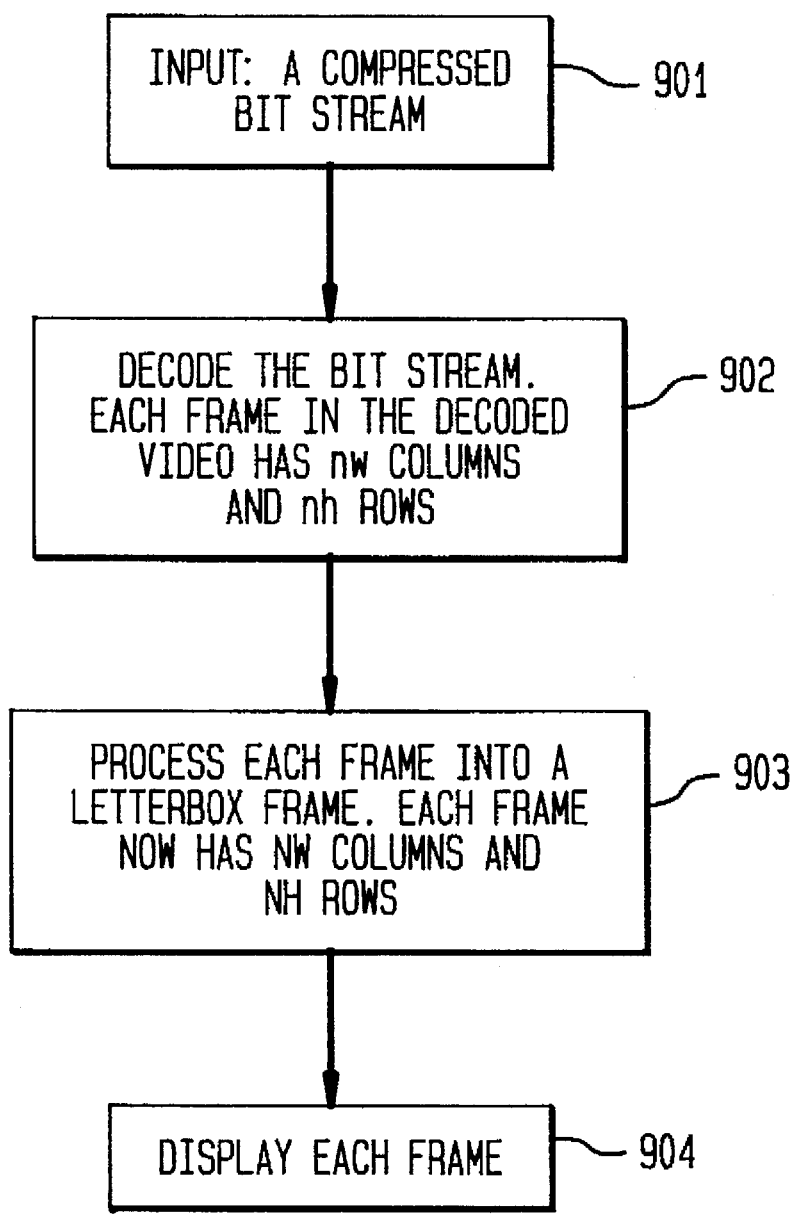
FIG. 9 is a flow chart of a method for decoding video and displaying the decoded video in letterbox format.

A method for decoding images and displaying them in letterbox form is shown as a flow chart in FIG. 9. In step 901 the compressed bit stream is input. In step 902, the compressed bit stream is decoded, and each frame in the decoded bit stream has nw columns and nh rows. In step 903, each frame is processed into a letterbox frame; the resulting frames have NW columns and NH rows. (The process of converting frames to letterbox format is shown in more detail in FIG. 10.) In step 904, each frame is displayed.

Figure 8:
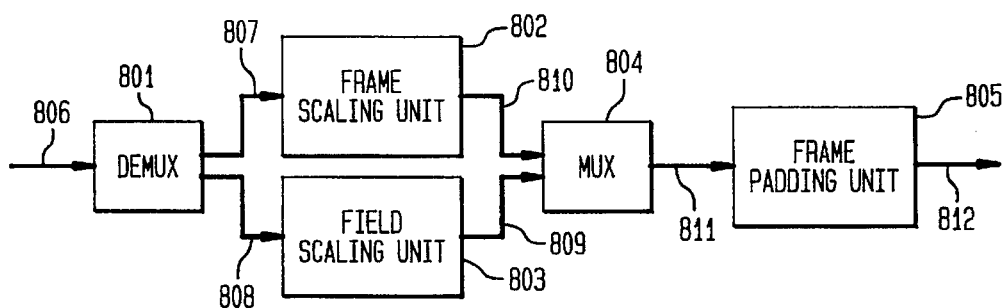
FIG. 8 is a block diagram of a letterbox subsystem.

An embodiment of a letterbox subsystem (702 in FIG. 7) is shown in FIG. 8. The letterbox subsystem receives an input video sequence 806 and produces an output video sequence 812.

The output video sequence 812 is designed to be shown on a display with NW columns and NH rows of pixels, where each pixel has a sample aspect ratio SAR. Each frame in the input video has nw columns and nh rows of pixels, and each pixel has a sample aspect ratio sat. The letterbox subsystem shown in FIG. 8 has a frame scaling unit 802, a field scaling unit 803 and a frame padding unit 805. The operation of these units depend on the parameters NW, NH, SAR, nw, nh, and sar. We will first give an overview of the entire subsystem, and then we will describe the frame scaling unit, field scaling unit and frame padding unit in detail.

Each frame of the input video 806 is fed to a demuliplexor 801. The demuliplexor sends each frame to either the frame scaling unit 802 or the field scaling unit 803 according to the following rule. If the frame came from a coded bit-stream where it was coded as non-interlaced frame, it is sent to the frame scaling unit as signal 807. Otherwise, it is sent to the field scaling unit as signal 808. When the frame scaling unit receives a frame, it scales the frame and then sends the scaled frame 810 to the multiplexor 804. When the field scaling unit receives a frame, it scales each field in the frame and then forms a scaled frame 809 from the two scaled fields and send it to the multiplexor 804. The multiplexor then takes either the scaled frame 809 or 810 (depending on whether the frame was coded as a non-interlaced frame) and sends it as the frame 811 to the frame padding unit 805, which produces an output frame 812.

Both the frame scaling unit and the field scaling unit rely on a technique called "image scaling"; an image with a given number of pixel rows and a given number of pixel columns is scaled to an image with a different number of rows and columns. We do not describe how this can be done in the general case, because such methods are known in the art; see, for example, "The Art of Digital Video" by John Watkinson, Focal Press, 1994, section 4.13.

The operation of the frame scaling unit is as follows. If DAR >dar, the frame scaling unit scales the input frame from an image with nw columns and nh rows to an image with NW columns and NH0=nh X (sat/SAR) X (NW/nw) rows. Note that if DAR>dar then NH0<NH. If DAR<dar, the frame scaling unit scales the input frame from an image with nw columns and nh rows to an image with NW0=nw X (SAR/sar )×(NH/nh) columns and NH rows. Note that if DAR<dar then NW0<NW.

The operation of the field scaling unit is as follows. If DAR>dar, the field scaling unit scales each field of the input frame from an image with nw columns and nh/2 rows to an image with NW columns and NH0/2 rows. These fields are then reassembled as a frame with NW columns and NH0 rows. If DAR<dar, the field scaling unit scales each field of the input frame from an image with nw columns and nh/2 rows to an image with NW0 columns and NH/2 rows. These fields are then reassembled as a frame with NW0 columns and NH rows.

Note that a display with a sample aspect ratio of SAR, NW columns and NH0 rows will have a display aspect ratio dar. A display with a sample aspect ratio of SAR, NW0 columns and NH rows will also have a display aspect ratio dar. Because the original frame 806 fed into the demultiplexor 801 has a display aspect ratio dar, and because the entire frame 806 is scaled to produce the frame 811, if the frame 811 is displayed on the either of these two displays the frame will appear undistorted. However, the display that we wish to use has either more rows or more columns then the frame 806, so we process the frame in the frame padding unit before it is displayed.

If DAR>dar, the input 811 to the frame padding unit has NW columns and NH0 rows; in that case, the frame padding units puts the rows of the frame 811 in the middle of a frame with NW columns and NH rows, and the remaining rows are filled with, for example a solid color (e.g., black or grey). If DAR<dar, the input 811 to the frame padding unit has NW0 columns and NH rows; in that case, the frame padding units puts the columns of the frame 811 in the middle of a frame with NW columns and NH rows, and the remaining columns are filled with, for example a solid color (e.g., black or grey). In either case, if the frame 812 is displayed on a display with NW columns, NH rows and a sample aspect ratio SAR, the frame will be in letterbox format; the entire frame 806 will be displayed (undistorted) on a part of the display area.

Figure 10:
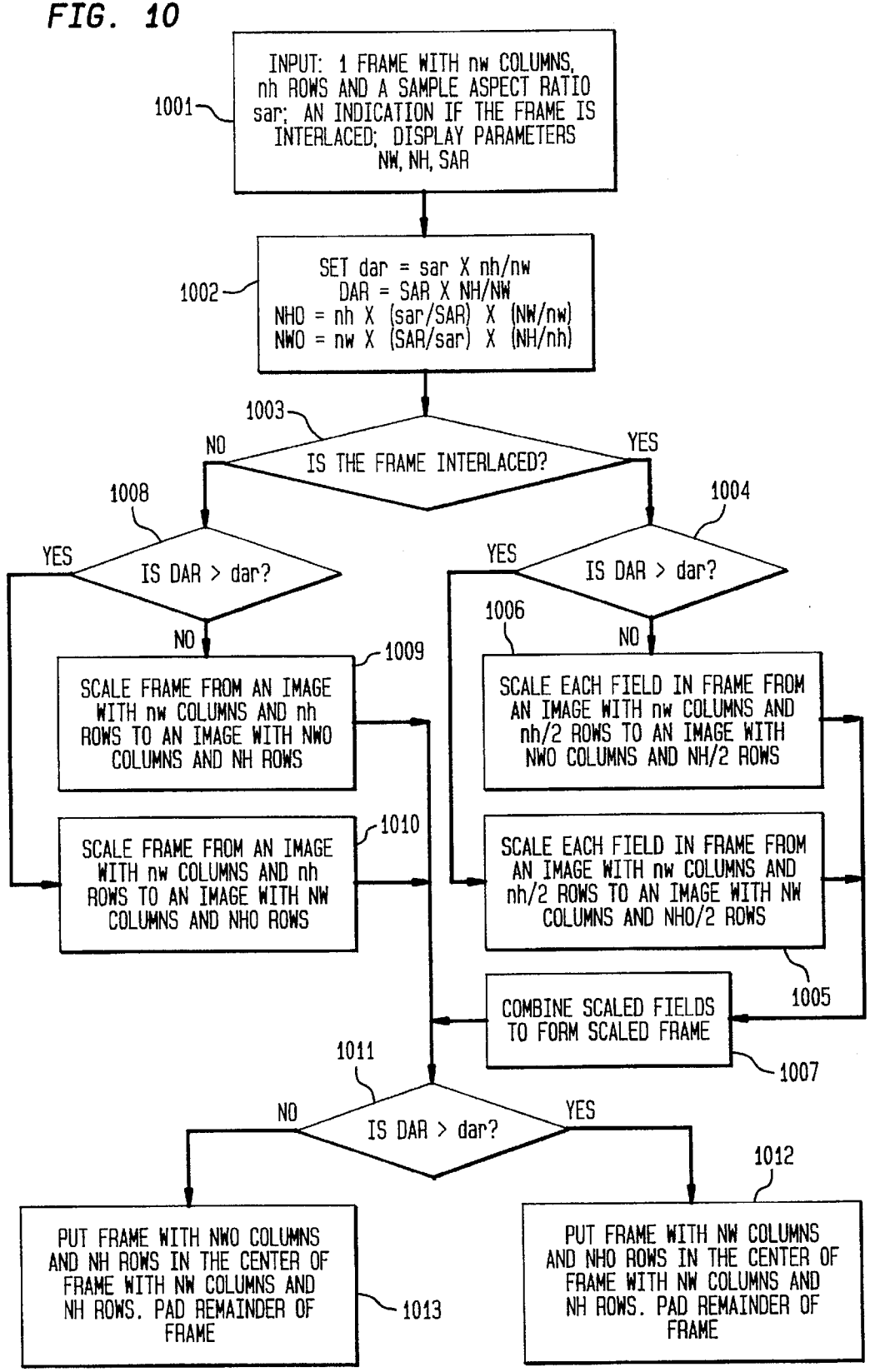
FIG. 10 is a flow chart of a method for converting decoded frames to letterbox format.

The process of converting frames into letterbox format can be understood by means of the flow-chart in FIG. 10. In step 1001 a frame is input. The frame has nw columns, nh rows and a sample aspect ratio sar, and an indication about whether or not the frame is interlaced is also given. Also input in step 1001 are display parameters; the display will have NW columns, NH rows, and a sample aspect ratio SAR.

In step 1002, the input display aspect ratio is calculated as the product of sar and nh divided by nw, the output display aspect ratio is calculated as the product of SAR and NH divided by NW, NH0 is calculated as the produce of: nh, sar divided by SAR, and NW divided by nw, and NW0 is calculated as the product of: nw, SAR divided by sar, and NH divided by nh.

In step 1003, we check to see if the frame is interlaced. If it is, control goes to step 1004, where it is determined whether DAR is greater than dar. If DAR is greater than dar, control goes to step 1005, where each field in the frame is scaled to an image with NW columns and NH0/2 rows; otherwise, in step 1006, each field is scaled to an image with NW0 columns and NH/2 rows. In either event, in step 1007 both fields are combined to form a scaled frame.

If in step 1003 it is determined that the frame is not interlaced, control goes to step 1008, where it is determined whether DAR is greater than dar. If DAR is greater than dar, control goes to step 1010, where the frame is scaled to an image with NW columns and NH0 rows; otherwise, in step 1009, the frame is scaled to an image with NW0 columns and NH rows.

After steps 1007, 1009, or 1010, control goes to step 1011, where we check to see if DAR is greater than dar. If DAR is greater than dar, then in step 1012 the frame with NW columns and NH0 rows is put in the center of a frame with NW columns and NH rows, and the remainder of the frame is padded. If PAR is not greater than dar, then in step 1013 the frame with NW0 columns and NH rows is put in the center of a frame with NW columns and NH rows, and the remainder of the frame is padded.

C. SWITCHABLE ASPECT RATIO SYSTEM

In accordance with an embodiment of this invention, a system and method are provided for receiving a video sequence with a given aspect ratio and displaying that sequence on a device with a different aspect ratio in letterbox or pan-scan format, at the users discretion, by performing, respectively, letterbox or pan-scan conversion immediately before display. An embodiment of such a system is shown in FIG. 6.

Figure 6:
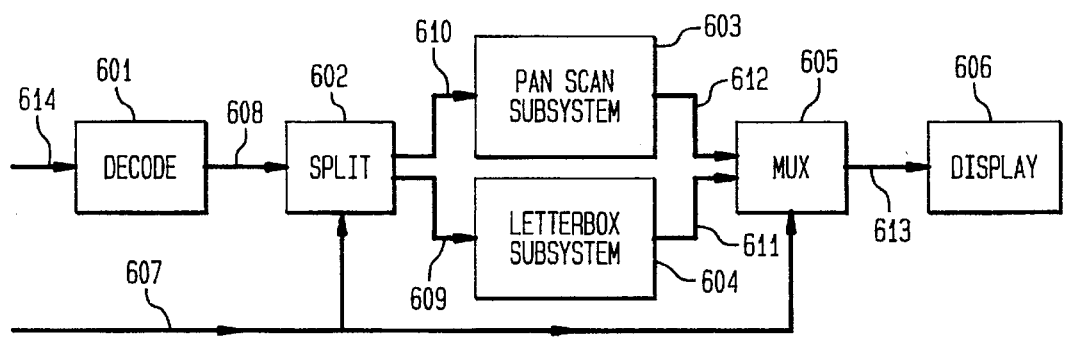
FIG. 6 is a block diagram of a video decoder and display system when the aspect ratio of the coded video is not the same as the aspect ratio of the encoded video and the video is displayed in pan-scan or letterbox form.

The system shown in FIG. 6 receives two inputs: a compressed video bit stream 614 and a switching signal 607. The switching signal 607 is set equal to 0 or 1 for each frame. The decoder 601 receives the compressed bit stream 614 and produces the decoded video 608. The decoded video is sent to a splitting device 602. The splitting device 602 sends the video stream 608 as the signal 610 to the pan-scan subsystem 603 if the switching signal 607 is set to 0, and it sends the video stream 608 as the signal 609 to the letterbox subsystem 604 if the switching signal 607 is set to 1. When the pan-scan subsystem 603 receives a frame, it converts it to pan-scan form by extracting a window from each frame (or, for interlaced video, a window from each of the two fields in the frame) and then scaling the window(s). The output frame 612 is then sent to the multiplexor 605.

When the letterbox subsystem 604 receives a frame, it converts it to letterbox form. The output frame 611 is then sent to the multiplexor 605. The letterbox system drawn in FIG. 8 can be used for this subsystem. The multiplexor 605 sends a frame 613 to the display 606. If the switching signal 607 is equal to 0, the frame sent is the frame 612 (output of pan-scan subsystem), and if the switching signal 607 is equal to 1, the frame sent is the frame 611 (output of letterbox subsystem).

Figure 11:
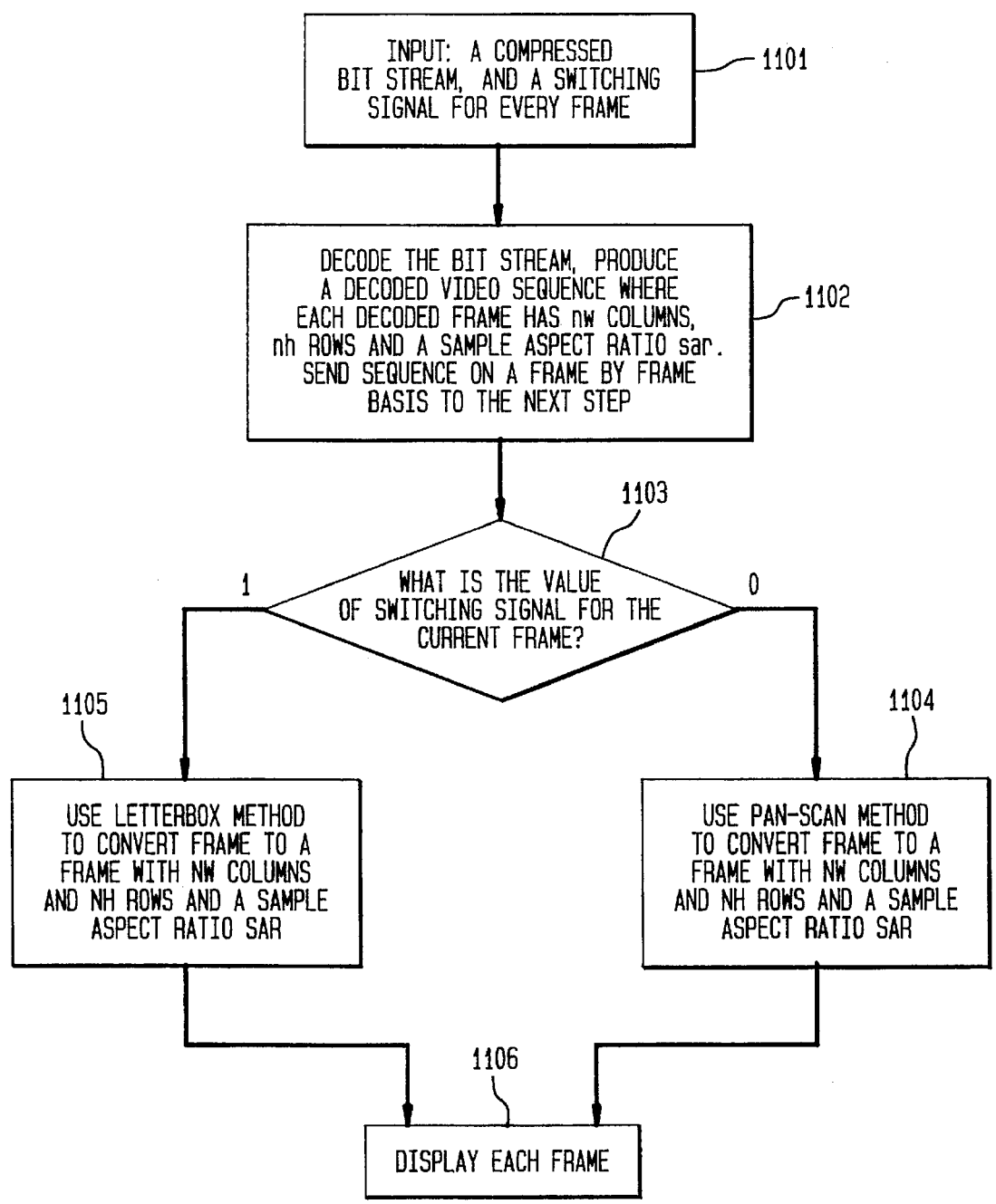
FIG. 11 is a flow chart of a method for decoding video and displaying the decoded video in pan-scan or letterbox format.

The process for displaying frames in either the pan-scan or letterbox format is shown in FIG. 11. In step 1101, we input a compressed bit stream and a switching signal for each frame. In step 1102, the bit stream is decoded, to produce a decoded video sequence where each frame has nw columns, nh rows and a sample aspect ratio sar. The sequence is then sent frame by frame to step 1103, which checks the switching signal for each frame. If the switching signal is equal to 0, control goes to step 1104, where the pan-scan method is used to convert each frame to a frame with NW columns, NH rows and a display aspect ratio SAR; if the switching signal is equal to 1, control goes to box 1105, where the letterbox method is used to convert each frame to a frame with NW columns, NH rows and a display aspect ratio SAR. In either event, control goes to step 1106, where each frame is displayed.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

I claim:

1. A system for displaying a received a video sequence with a given display aspect ratio on a display device having a different display aspect ratio, wherein the video sequence comprises a number of frames of the given display aspect ratio having a first number of pixel columns and a second number of pixels rows, comprising:

a video decoder connected to receive the video sequence;

a letterbox subsystem, connected to received a decoded version of the video sequence from the video decoder, the letterbox subsystem including:

frame scaling means for applying frame-based scaling to the frames so as to produce an output frame with the given display aspect ratio but having only one of the number of rows or the number of columns equal to the number of rows or columns in the intended display;

field scaling means for applying field-based scaling to the frames so as to produce an output frame with the given display aspect ratio but having only one of the number of rows or the number of columns equal to the number of rows or columns in the intended display;

a multiplexor coupled to the frame scaling and the field scaling means, for selectably providing at its output the output frame from one of the field scaling means and the frame scaling means responsive to whether the frame is interlaced;

frame padding means connected to receive the output from the multiplexor for unit, for padding the frame so as to fill the entire display area; and, a display device connected to receive an output of the letterbox subsystem;

wherein the letterbox subsystem converts the video sequence into a format in which each picture can be viewed in its entirety without filling the entire viewing area of the display device.

2. A system for displaying a received a video sequence with a given display aspect ratio on a display device having a different display aspect ratio, comprising:

a video decoder connected to receive the video sequence;

a letterbox subsystem coupled to the video decoder, the letterbox subsystem including:

frame scaling means for applying frame-based scaling to the frames so as to produce an output frame with the given display aspect ratio but having only one of the number of rows or the number of columns equal to the number of rows or columns in the intended display;

field scaling means for applying field-based scaling to the frames so as to produce an output frame with the given display aspect ratio but having only one of the number of rows or the number of columns equal to the number of rows or columns in the intended display;

a multiplexor coupled to the frame scaling and the field scaling means, for selectably providing at its output the output frame from one of the field scaling means and the frame scaling means responsive to whether the frame is interlaced;

frame padding means connected to receive the output from the multiplexor for unit, for padding the frame so as to fill the entire display area;

a pan-scan subsystem coupled to the video decoder;

a display device; and, a multiplexor coupled to the letterbox subsystem and the pan-scan subsystem, the multiplexor being responsive to a user initiated control signal for sending one of an output of the letterbox subsystem and an output of the pan-scan subsystem to the display device;

wherein a user can selectably control whether the video is to be displayed in a letterbox format in which each picture can be viewed in its entirety without filling the entire viewing area of the display device or a pan-scan format in which a portion of each picture in the video sequence is displayed on the entire viewing area of the display device.

3. A method of displaying a compressed video sequence with a given display aspect ratio on a display device having a different display aspect ratio, comprising the steps of:

(a) decoding the compressed video sequence to produce a decoded video sequence;

(b) responsive to a control signal, converting each frame of the displayable video sequence into one or letterbox format or pan-scan format; and (c) displaying least some of the frames produced by the converting;

wherein the converting to a letterbox format comprises the steps of, for each frame:

(d) calculating an input display aspect ratio as the product of a sample aspect ratio of the frame to be displayed and a number of columns and a number of rows in the frame to be displayed;

(e) calculating an output display aspect ratio as the product of the sample aspect ratio of the display device and the number of rows and number of columns displayable on the display device;

(f) calculating the number of rows and number of columns to be displayed on the display device as a function of the input display aspect ratio and the output display aspect ratio;

(g) determining if the frame is interlaced;

(h) when it is determined that the frame is not interlaced, scaling the frame if the frame using frame based scaling such that a resulting scaled frame has a sample aspect ratio equal to the sample aspect ratio of the display device the number of rows and columns calculated in step f;

(i) when it is determined that the frame is interlaced, scaling each field of the frame such that resulting fields have sample aspect ratios equal to the sample aspect ratio of the display device and either half the number of columns or half the number of rows calculated in step f, and combining the resulting fields to form the scaled frame; and, (j) padding the scaled frame, so that it has the same number of columns and the same number of rows as the display device.

4. A system for displaying a compressed video sequence with a given display aspect ratio on a display device having a different display aspect ratio, comprising:

means for decoding the compressed video sequence to produce an displayable video sequence;

means, responsive to a user initiated control signal, for converting each frame or the displayable video sequence into one or letterbox format or pan-scan format; and means for displaying the frames produced by the converting;

wherein the means for converting comprises:

means for determining if each frame is interlaced;

logic means for (a) when it is determined that a frame is not interlaced, scaling the frame if the frame using frame based scaling such that a resulting scaled frame has a sample aspect ratio equal to the sample aspect ratio of the display device and either the same number of columns or the same number of rows as the display device; and (b) when it is determined that the frame is interlaced, scaling each field of the frame such that resulting fields have sample aspect ratios equal to the sample aspect ratio of the display device and either the same number of columns or half the same number of rows as the display device, and resulting fields to form the scaled frame; and, means for padding the scaled frame, so that it has the same number of columns and the same number of rows as the display device.

* * * * *